(12) United States Patent
Callaghan et al.

(10) Patent No.: US 8,825,674 B2
(45) Date of Patent: Sep. 2, 2014

(54) ENCODING DATA TO BE SORTED

(75) Inventors: Mark D. Callaghan, Palo Alto, CA (US); Dmitry M. Potapov, Emerald Hills, CA (US)

(73) Assignee: Oracle International Corporation, Redwood Shores, CA (US)

( * ) Notice: Subject to any disclaimer, the term of this patent is extended or adjusted under 35 U.S.C. 154(b) by 256 days.

(21) Appl. No.: 12/506,126

(22) Filed: Jul. 20, 2009

(65) Prior Publication Data

US 2009/0282040 A1 Nov. 12, 2009

Related U.S. Application Data

(62) Division of application No. 10/996,742, filed on Nov. 24, 2004, now Pat. No. 7,587,396.

(51) Int. Cl.
*G06F 7/00* (2006.01)
*G06F 17/30* (2006.01)

(52) U.S. Cl.
CPC ... *G06F 17/30321* (2013.01); *Y10S 707/99936* (2013.01); *Y10S 707/99937* (2013.01)
USPC ............. 707/752; 707/801; 707/999.006; 707/999.007

(58) Field of Classification Search
USPC .................................. 707/752, 753
See application file for complete search history.

(56) References Cited

U.S. PATENT DOCUMENTS

| | | | |
|---|---|---|---|
| 5,001,477 A | 3/1991 | Hicks et al. | |
| 5,396,622 A | 3/1995 | Lee et al. | |
| 5,414,834 A * | 5/1995 | Alexander et al. | 1/1 |
| 5,506,580 A | 4/1996 | Whiting et al. | |
| 5,555,403 A * | 9/1996 | Cambot et al. | 1/1 |
| 5,627,979 A * | 5/1997 | Chang et al. | 715/763 |
| 5,819,057 A | 10/1998 | Witt et al. | |
| 5,819,059 A | 10/1998 | Tran | |

(Continued)

FOREIGN PATENT DOCUMENTS

EP 0582907 2/1994

OTHER PUBLICATIONS

EP0588445 B1; Published by European Patent Office; Publication date: May 19, 1999.*

(Continued)

*Primary Examiner* — Daniel Kuddus

(74) *Attorney, Agent, or Firm* — Hickman Palermo Truong Becker Bingham Wong LLP; Adam C. Stone

(57) ABSTRACT

Key conditioning involves the construction of a byte orderable array from values for a possibly multi-field key concatenated key, for comparison by a sort routine. Byte-orderable sort keys are conditioned prior to execution of a sort routine, to facilitate an accurate and/or efficient sort procedure. Key conditioning may be applied to values in one or more columns of a database table, where the column(s) are used as keys for sorting rows of the table. Six factors are considered in encoding the byte array, such as whether nulls compare high or low; whether a field is fixed width or variable width; whether a field is guaranteed to be not null; whether a field is ordered ascending or descending; whether a field is the last field of a multi-field sort key or the only field of a sort key; and whether a field is likely to contain a significant number of zero values.

26 Claims, 2 Drawing Sheets

(56) References Cited

U.S. PATENT DOCUMENTS

| | | | |
|---|---|---|---|
| 5,828,853 A * | 10/1998 | Regal | 710/315 |
| 5,933,104 A | 8/1999 | Kimura | |
| 5,999,649 A * | 12/1999 | Nicholson et al. | 382/190 |
| 5,999,949 A * | 12/1999 | Crandall | 715/234 |
| 6,023,705 A * | 2/2000 | Bellinger et al. | 1/1 |
| 6,327,587 B1 * | 12/2001 | Forster | 1/1 |
| 6,334,123 B1 | 12/2001 | Ross et al. | |
| 6,611,598 B1 | 8/2003 | Hayosh | |
| 6,654,807 B2 * | 11/2003 | Farber et al. | 709/225 |
| 7,103,708 B2 * | 9/2006 | Eatherton et al. | 711/108 |
| 7,120,638 B1 | 10/2006 | Cesare et al. | |
| 7,336,956 B2 * | 2/2008 | Halonen et al. | 455/450 |
| 7,395,555 B2 | 7/2008 | Aldridge et al. | |
| 7,512,610 B1 * | 3/2009 | Barabas et al. | 1/1 |
| 8,131,739 B2 * | 3/2012 | Wu et al. | 707/758 |
| 2002/0052941 A1 * | 5/2002 | Patterson | 709/223 |
| 2002/0083033 A1 | 6/2002 | Abdo et al. | |
| 2003/0182278 A1 * | 9/2003 | Valk | 707/3 |
| 2003/0182310 A1 * | 9/2003 | Charnock et al. | 707/104.1 |
| 2004/0002954 A1 * | 1/2004 | Chaudhuri et al. | 707/2 |
| 2004/0199529 A1 * | 10/2004 | Clark et al. | 707/100 |
| 2005/0165794 A1 * | 7/2005 | Mosescu | 707/100 |

OTHER PUBLICATIONS

Blasgen, M. et al., "An Encoding Method for Multifield Sorting and Indexing" ACM, vol. 20, Dated Nov. 1977, 5 pages.

* cited by examiner

ARRAYS OF BYTES:

[FIELD 1] [FIELD 2          ] [FIELD 3           ]
    {[]      [(1000 1111) (0101 1100)] [(0010 1000) (0000 0101)]}

[FIELD 1        ] [FIELD 2    ] [FIELD 3        ]
    {[(0010 1110) (0000 0101)] [(1000 1001)] [(1101 0010) (0010 1110)]}

| SOCIAL SECURITY NO | FIRST NAME | SURNAME |
|---|---|---|
| 123-45-6789 | THOMAS | SMITH |
| null | ALEXANDER | JEFFERSON |
| . | . | . |
| . | . | . |
| . | . | . |
|  |  |  |

ENCODING DATA TO BE SORTED

CROSS-REFERENCE TO RELATED APPLICATIONS; BENEFIT CLAIM

This application claims benefit as a Divisional of application Ser. No. 10/996,742, filed Nov. 24, 2004 now U.S. Pat. No. 7,587,396, entitled "Encoding Data To Be Sorted"; the entire contents of which is hereby incorporated by reference as if fully set forth herein, under 35 U.S.C. §120. The applicant(s) hereby rescind any disclaimer of claim scope in the parent application(s) or the prosecution history thereof and advise the USPTO that the claims in this application may be broader than any claim in the parent application(s).

TECHNICAL FIELD

The present invention relates to sorting information and, specifically, to techniques for encoding data so that the data can be sorted efficiently.

BACKGROUND

In the current age of information technology, massive volumes of data are generated, stored and processed, to meet innumerable needs. Over the years, much effort has been devoted to developing better data storage and sort technologies, in order to handle the data expansion that has occurred, both in volume and use of data.

One aspect of efforts to manage the ever-expanding volume of and reliance on data involves the evolution of database technology and, specifically, relational database technology. In relational databases, rows are composed of multiple columns (c0, c1, c2, . . . ). For example, FIG. 1 is a block diagram that illustrates a database table 100, containing rows (data items) that have multiple columns ("SURNAME", "FIRST NAME", "SOCIAL SECURITY NO"). During processing of data from a database, the data items extracted from rows are frequently ordered by more than one associated column or field. The fields by which data items are sorted are referred to as sort keys. For example, with table 100 (named "emp"), a query on the table may be as follows:

select * from emp order by surname, first_name, social_security_no.

In this example, the surname, first_name, and social_security_no fields are all sort keys.

Requests for sorting of data often include various options for one or more of the sort keys, such as (1) whether data items having a sort key with the value "null" are ordered first or last relative to that sort key; and (2) whether data items are ordered in ascending or descending order relative to sort key values. For example select * from emp order by surname nulls last, first_name, social_security_no descending.

This example specifies that nulls are ordered last for the surname key and that the data items are to be sorted in descending order for the social_security_no key.

Most columns are byte orderable. A column is byte orderable when the values in the column can be represented as an array of bytes, and the order between any two values in the column can be determined by comparing bytes of the arrays that represent the values, at the same index into the arrays, until an index is found at which the bytes differ.

In operations in which rows are sorted by more than one sort key (e.g., more than one column), where each sort key is separately byte orderable, there are two general approaches for encoding values from the sort keys. The first approach is to compare values for one sort key at a time, from each row, until the rows do not have the same value for a given key. The second approach is to concatenate the bytes that represent respective values for the sort keys for each row, where the bytes for each key are ordered within the array based on the parameters of the sort request (e.g., a database query), thereby creating a contiguous array of bytes for each row. Then, one byte-wise comparison is performed for the concatenated byte arrays for two rows being compared. The second approach (referred to hereafter as the "concatenated key" approach) is typically more efficient than the first approach, and enables other optimizations.

For example, with reference to FIG. 1, the bytes that represent the values in the "surname" field ("field 1") for the data items associated with "Thomas Smith" and "Alexander Jefferson" can be compared when sorting and ordering the data items. For data items being compared, arrays of bytes representing values for one or more fields are compared until the bytes do not match, at which point a determination is made as to which data item orders higher with respect to the other data item, for that particular key field. Such a determination is based on parameters governing the sort, such as" nulls order first" versus "nulls order last," and ascending versus descending order.

Likewise, the bytes that represent the values in the "first_name" field ("field 2") and the "social_security_no" field ("field 3) in one data item can be compared with the bytes that represent values for those fields in another data item to determine the relative order of data items based on those key fields. Using the concatenated key approach, arrays of bytes, each of which represents values in all of the key fields of a given data item, can be compared to order all the data items involved in the sort operation in response to the request.

When the sorting columns each have a fixed width, the concatenated key approach works well. Unfortunately, when a sorting column is variable width or may be null, the concatenated key approach fails. For example, with reference to FIG. 1, the array of bytes associated with "Alexander Jefferson" contains a null byte (field 1), which cannot be compared to the similar byte (field 1) for "Thomas Smith," which contains a non-null value. For another example, FIG. 1 depicts that field 2 is a variable width field, where the number of bytes that represent the values in the "first_name" field vary from data item to data item. Thus, because it requires two bytes (for example only) to encode "Alexander" but only one byte to encode "Thomas", a comparison of the byte(s) to order the data items based on field 2 yields incorrect results. This is because the later bytes of the longer value will be compared to the first bytes of the value for the next field. In the example, ignoring for now the fact that field 1 contains a null, the second byte of "Alexander" will be compared to the first byte of "Jefferson".

One solution to the variable-width column challenge is described in "An Encoding Method for Multifield Sorting and Indexing," by Blasgen, Case and Eswaran, CACM, November 1977, Volume 20, Number 11. This article describes a method for encoding variable-width columns by using extra "marker" bytes. That is, for every (N−1) bytes of a variable width column, a marker byte is written that indicates whether there is more data from the variable width column. For example, assume N=4, the variable width column contains the value "123" for one data item and "1234" for another data item, and the value of the marker byte is "M" when there is more data from the column and "D" when there is no more data from the column. The value in the column for the one data item is encoded with four bytes as "123D" and the value in the column for the other data item is encoded with five bytes as "123M4". However, this approach depends on an accurate estimate of the average width of the encoded column. If the estimate is bad, or if the width of the column varies significantly, then excessive space may be used to encode the column.

Based on the foregoing, there is room for improvement in techniques for sorting information efficiently. Specifically, there is room for improvement in techniques for encoding data to be sorted according to the various ordering options described above.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENTS OF THE INVENTION

Techniques are provided for encoding data to be sorted. These techniques are generally referred to herein as "key conditioning," which refers to the transformation (i.e., "conditioning") of sort keys, so that the sort process is accurate and efficient. Key conditioning involves the construction of a byte orderable array from a possibly multi-field key (concatenated key). For a non-limiting example, the sort keys are table columns in a relational database.

There are five transformations that can be performed to encode fields for accurate and efficient sorting. Any combination of the transformations can be performed. The transformations are summarized as follows.

(1) transformations to order fields with null values first (compare low) or null values last (compare high).
(2) transformations applied to variable-width fields.
(3) transformation performed to order fields descending rather than ascending.
(4) transformation performed to support faster key comparisons.
(5) transformation performed to support faster key comparisons.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a block diagram that illustrates a database table that contains rows that have multiple columns.

DETAILED DESCRIPTION

Figure 2:
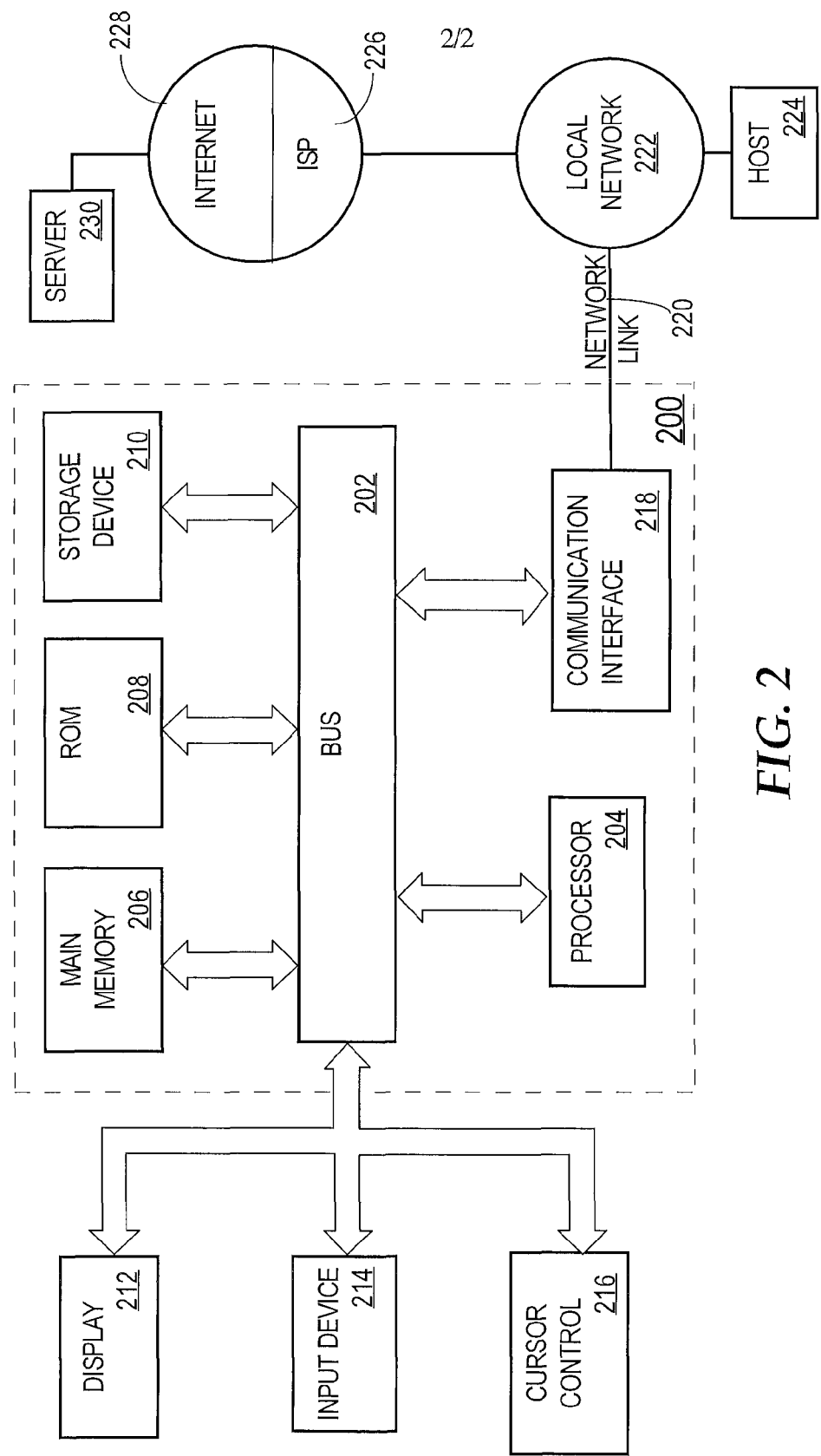
FIG. 2 is a block diagram of a computer system on which an embodiment of the invention may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Key Conditioning-Generally

Key conditioning involves the construction of a byte orderable array from a possibly multi-field key (concatenated key).

Sort keys are conditioned prior to execution of a sort routine or algorithm, to facilitate an accurate and/or efficient sort procedure by the routine. For example, key conditioning may be applied to values in one or more columns of a database table, where the column(s) are used as keys for sorting rows of the table.

Different embodiments of the invention apply to different scenarios. That is, six factors are used to determine how the key fields are encoded in the byte orderable array. The factors are:

(1) Do nulls compare high or low?
(2) Is the field fixed width or variable width?
(3) Is the field guaranteed to be not null?
(4) Is the field ordered ascending or descending?
(5) Is the field the last field of a multi-field sort key, or the only field of a sort key?
(6) Is the field likely to contain the value "0"?

Nulls Order First or Nulls Order Last

In one embodiment, in response to a sort request, an array of bytes is constructed, for each data item to be sorted, that represents the values for one or more fields. To account for a sort request that specifies ordering of nulls first or nulls last, the array of bytes is constructed by prepending a first value to fields having non-null values and representing null fields with a second value, where the first value is different than the second value. For nulls last, the first value is less than the second value, For nulls first, the first value is greater than the second value.

That is, with keys that may contain nulls, an indicator byte is written to indicate whether the field is null. The value of the indicator byte is determined based on whether nulls are supposed to be ordered first or ordered last. In one embodiment, for "nulls first", a non-null field is preceded by an indicator byte with the value "253" and a null field is preceded by an indicator byte with the value "2". In one embodiment, for "nulls last", a non-null field is preceded by an indicator byte with the value "1" and a null field is preceded by an indicator byte with the value "254". These indicator bytes ensure that null fields compare first or last, as desired.

Nulls Last Example

The following example orders a field with a null value as greater than a field with a non-null value. A null indicator byte is prepended to the bytes that contain the values for the key fields. The value of the indicator byte is "254" if the field is null and "1" if the field is not null.

| key | input key (bytes) | output (bytes) | explanation |
| --- | --- | --- | --- |
| k1 | ( ) = null | (254) | The field is null and has no bytes. The byte having the value "254" is prepended. |
| k2 | (0) | (1, 0) | The field is not null. The byte having the value "1" is prepended. |
| k3 | (255) | (1, 255) | The field is not null. The byte having the value "1" is prepended. |

From the output, k1 > k2 and k1 > k3, so that null fields compare greater than non-null fields.

Nulls First Example

The following example orders a field with a null value as less than a field with a non-null value. A null indicator byte is prepended to the bytes that contain the values for the key fields. The value of the indicator byte is "2" if the field is null and "253" if the field is not null.

| key | input key (bytes) | output (bytes) | explanation |
|---|---|---|---|
| k1 | ( ) = null | (2) | The field is null and has no bytes. The byte having the value "2" is prepended. |
| k2 | (1) | (253, 1) | The field is not null. The byte having the value "253" is prepended. |
| k3 | (255) | (253, 255) | The field is not null. The byte having the value "253" is prepended. |

From the output, k1 < k2 and k1 < k3, so that null fields compare less than non-null fields.

Variable Width Key Fields

In one embodiment, in response to a sort request, an array of bytes is constructed, for each data item to be sorted, that represents the values for one or more fields. To account for a sort request that specifies ordering based on at least one variable width field, the array of bytes is constructed by modifying byte(s) that represent the value for the variable width field to ensure that no portion of the relevant byte(s) matches a particular termination indicator value, and the particular termination indicator value is appended at the end of the byte(s) to indicate the end of the byte(s) that represent the value for the variable width field.

In one embodiment, with variable width keys, two field termination bytes are written to indicate that a field has terminated, to make a field that terminates compare low in relation to a field that has not terminated. In a related embodiment, the value of both field termination bytes is "0". In addition, any original byte in the field that has a value zero is replaced by two bytes having the values {0, 1}. Therefore, the only occurrence of two bytes having the values {0, 0} is at the end of a field. Because bytes that have the value "0" are replaced with two bytes, this can increase the size of the encoded key. Thus, the field termination key is only used when necessary, and optimizations limit the use of the field termination key.

Field Termination-Example

The following example appends an end-of-field terminator to a field so that all comparisons for variable width fields will end at the end-of-field unless the fields are equal. The end-of-field terminator is two bytes, each byte with the value "0", i.e., (0, 0). Each byte in the input key field that has the value "0" is replaced with two bytes, (0, 1), so that the only time that consecutive bytes with the value "0" occur is in the end-of-field terminator.

| key | input key (bytes) | output (bytes) | explanation |
|---|---|---|---|
| k1 | (0) | (0, 1, 0, 0) | The byte having the value "0" is replaced with a pair of bytes, (0, 1), and the field terminator, (0, 0), is appended. |
| k2 | (0, 0) | (0, 1, 0, 1, 0, 0) | Each of the input bytes having the value "0" is replaced with a pair of bytes, (0, 1), and the field terminator, (0, 0), is appended. |
| k3 | (0, 1) | (0, 1, 1, 0, 0) | The input byte having the value "0" is replaced with a pair of bytes, (0, 1), and the field terminator, (0, 0), is appended. |
| k4 | (1) | (1, 0, 0) | The field terminator, (0, 0), is appended. |

From the output, the keys are ordered as k1 < k2 < k3 < k4.

Because bytes that have the value "0" are replaced with two bytes, this increases the size of the encoded key. Thus, use of the field termination bytes is limited. For example, the last field of a possible multi-field key does not need field termination encoding when sorting in ascending order because the end of the key is known and a key that ends will compare low with a key that does not end. In contrast, when sorting in descending order, a key that ends must compare high with a key that does not end.

In one embodiment, an alternative encoding scheme is used for keys that contain a variable width field and a significant number of the key values are likely to be "0". In response to a sort request, an array of bytes is constructed, for each data item to be sorted, that represents the values for one or more fields. To account for a sort request that specifies ordering based on at least one variable width field, the array of bytes is constructed by (1) representing the value for the variable width field as a string of bits; (2) forming a series of 7-bit strings based on the string of bits; and (3) adding a flag bit to each 7-bit string to create a series of bytes based on the 7-bit strings, where the flag, in a given byte, indicates whether the byte is the last byte that represents the value for the variable width field.

The alternative encoding for variable width fields does not replace bytes that have the value "0" with two bytes. Instead, in one embodiment, seven bits in each byte for a field are encoded based on the value in the field, the most significant bit of the byte is set to indicate that there is data (i.e., the value in the field, or at least part of the value in the field) in that byte, and the a byte with the value "0" is appended after the encoded key bytes. This alternative encoding scheme is used when the size of an encoded key might be too large if the field termination bytes were used.

Alternative Field Termination-Example

Input bytes, (0,1), are represented in bit form as, {(0000 0000), (0000 0001)}. Encoded in the alternative field termination format, the output is represented in bit format as, {(<u>1</u>000 0000), (<u>1</u>000 0000), (<u>1</u>010 0000), (<u>0</u>000 0000)}, where the underlined ones are the most significant bits set to indicate that part of the key value data is in that byte and the underlined zero is the most significant bit cleared to indicate the end of the key value data; and where the byte in which the most significant bit is cleared contains all zero bits; and where the bold numerals in the output represent the corresponding bold numerals in the input. If the field termination scheme were used instead of the alternative field termination scheme, then the output would be represented in byte format as, (0,1,1,0,0), as described in the field termination example above, which consists of five bytes instead of the four bytes for the alternative scheme.

Fields to be Sorted in Descending Order

For fields that are to be sorted in descending order, a complement of the key value(s) are used to represent the value in the field, so that the field is sorted in descending order. For a system in which bytes can have base-10 values from 0 to 255, the complement value is equal to 255 minus the original value. The complement is used for all of the bytes used to encode the field except for the null indicator bytes.

Complement-Example

The following example replaces each byte in the field with its complement, which is defined as (255 minus the value of the byte). Thus, such fields will sort in descending order.

| key | input key (bytes) | output (bytes) | explanation |
|---|---|---|---|
| k1 | (0) | (255) | The byte having the value "0" is replaced with the complement of "0", which is 255 − 0 = 255. |
| k2 | (1) | (254) | The byte having the value "1" is replaced with the complement of "1", which is 255 − 1 = 254. |

From the output, the keys are in descending order: k1 > k2.

Sort Optimizations

Optimizations schemes are applicable to each of the sort encoding schemes described herein, to provide for more efficient execution of a comparison routine that compares byte arrays.

Distinct Padding for Non-Distinct Fields

Sort algorithms and comparison routines typically terminate, for each iteration that compares two key values, in one of two manners: (1) when a difference is found between the two key values, or (2) when the end of key values are reached. In scenarios in which none of the sort key fields are known to be unique (i.e. no distinct, primary key), in one embodiment, each sort key value is made unique. For example, each array of bytes that represents the values for fields on which data items are sorted is forced to be unique. Hence, the comparison routine does not have to check for the end-of-key for the comparison keys during each iteration of the loop that compares key bytes because the comparison routine will terminate and indicate that one of the keys is less than the other key before the end of either key is reached.

In one embodiment, in response to a sort request, an array of bytes is constructed, for each data item to be sorted, that represents the values for one or more fields. To account for a sort request that specifies ordering based on fields that are not known to contain unique values, the array of bytes is constructed by appending a unique value at the end of each byte array. In a related embodiment, an extra field and associated value is appended to the end of the bytes that represent the key values. This extra field is only used for the duration of the sort, and is dropped when data is returned from the sort. The extra field makes each key distinct. Consequently, the comparison routine does not need to check for the end-of-key for each iteration of the loop, and processing for checking for the end-of-key can be eliminated. Thus, a more efficient key comparison routine is provided.

In one embodiment, the value of a counter is appended as the extra field, and the counter is incremented for each row.

Storing Byte Arrays Based on Operational Characteristics of Processor

In one embodiment, the byte arrays that are constructed to represent the values for the key fields are stored in a manner that is based on the operational characteristics of one or more processors on which a comparison routine will execute, for sorting and ordering the data items associated with the byte arrays.

In one embodiment, each byte array that represents the values for the sort key fields is stored in one or more series of memory bits, where the size of the series is based on the processor word size. For example, the byte arrays are aligned to the machine word boundary, that is, the bytes are stored in chunks of memory that are an equivalent size to a multiple of the machine word size. For example, for a 32-bit processor, the array bytes are stored in 32-bit chunks or, perhaps, a multiple thereof. Consequently, the processor can perform comparisons between byte arrays one machine word at a time, which is an inherently more efficient process than if the bytes are not transformed and not compared one word at a time.

In one embodiment, each byte array that represents the values for the sort key fields is formatted so that they provide correct results when the comparison is done one machine word at a time rather than one byte at a time. This formatting is, therefore, based on the operational characteristics of the processor on which a comparison routine will execute. For example, the approach used by some processors is to process data in big-endian order, while the approach used by other processors is to process data in little-endian order. The bytes do not need to be reordered for big-endian machines; bytes (e.g., $b_0$ $b_1$ $b_2$, etc.) in big-endian ordering and aligned at a 32-bit machine word boundary would be stored as follows: ($b_0$ $b_1$ $b_2$ $b_3$). For little-endian machines, bytes are ordered and aligned at a 32-bit machine word boundary as follows: ($b_3$ $b_2$ $b_1$ $b_0$).

The format transformation is done for every four bytes of the byte array. If the length of the conditioned key is not a multiple of the machine word size, additional bytes can be appended to the byte array to make the array size a multiple of the machine word size. In one embodiment, when N bytes need to be appended, the first (N−1) bytes have the value "0" and the last appended byte has the value (255−N). If used in conjunction with either the field termination schemes described herein, this transformation is performed after applying the field termination scheme.

Combinations of Encoding Schemes

In response to combinations of the sort factors (described above), combinations of the encoding schemes described herein can be implemented. Several non-limiting examples of combination encodings are as follows.

Nulls Last, Field Termination

This example orders null fields last and supports variable-width fields, each of which is described individually herein.

| key | input key | output | explanation |
|---|---|---|---|
| k1 | ( ) = null | (254, 0, 0) | "254" is prepended for the null field. The field terminator, (0, 0) is then appended. |
| k2 | (0) | (1, 0, 1, 0, 0) | "1" is prepended for the not null field. The input byte with the value "0" is replaced by the pair of bytes, (0, 1). The field terminator, (0, 0) is then appended. |
| k3 | (1, 0) | (1, 1, 0, 1, 0, 0) | "1" is prepended for the not null field. The input byte with the value "1" is then appended. The pair of bytes, (0, 1), is then appended in place of the input byte with the value 0. The pair of bytes, (0, 0), is then appended as the field terminator. |

From the output, the keys are ordered as k2 < k3 < k1.

Nulls Last, Complement

This example orders null fields last and sorts fields in descending order, each of which is described individually herein.

| key | input key | output | explanation |
|---|---|---|---|
| k1 | ( ) = null | (254) | "254" is prepended for the null field. |
| k2 | (0) | (1, 255) | "1" is prepended for the not null field. The complement of the input byte with the value "0" is then appended with the value "255". |
| k3 | (1) | (1, 254) | "1" is prepended for the not null field. The complement of the input byte with the value "1" is then appended with the value "254". |

The keys are in descending order with nulls last: k3 < k2 < k1.

Nulls First, Complement

This example orders null fields last and sorts fields in descending order, each of which is described individually herein.

| key | input key | output | explanation |
|---|---|---|---|
| k1 | ( ) = null | (2) | "2" is prepended for the null field. |
| k2 | (0) | (253, 255) | "253" is prepended for the not null field. The complement of the input byte with the value "0" is then appended with the value "255". |
| k3 | (1) | (253, 254) | "253" is prepended for the not null field. The complement of the input byte with the value "1" is then appended with the value "254". |

The keys sort in descending order with nulls first: k1 < k3 < k2.

Nulls First, Field Termination, Complement

This example orders null fields first, sorts fields in descending order and supports variable-width fields, each of which is described individually herein.

| key | input key | output | explanation |
|---|---|---|---|
| k1 | ( ) = null | (2, 255, 255) | The byte "2" is prepended to indicate the field is null. The field terminator is then appended. The field terminator for descending sorts, (255, 255) is the complement of the field terminator for ascending sorts, (0, 0). |
| k2 | (0) | (253, 255, 254, 255, 255) | The byte "253" is prepended to indicate a non-null field. The input byte with the value "0" is replaced by the pair of complement bytes, (255, 254). The field terminator complement, (255, 255), is then appended. |
| k3 | (1) | (253, 254, 255, 255) | The byte "253" is prepended to indicate a non-null field. The input byte with the value "1" is replaced by its complement. The field terminator complement, (255, 255) is then appended (255, 255). |

The keys sort in descending order with nulls first: k1 < k3 < k2.

Field Termination, Complement

This example sorts fields in descending order and supports variable width fields, each of which is described individually herein.

| key | input key | output | explanation |
|---|---|---|---|
| k1 | (0) | (255, 254, 255, 255) | The input byte with the value "0" is replaced by the pair of complement bytes, (255, 254), which is the complement of the normal pair of replacement bytes, (0, 1). The field terminator is then appended. The field terminator complement is the pair of bytes, (255, 255), which is the complement of the field terminator used for ascending sorts. |
| k2 | (1) | (254, 255, 255) | The complement of the input byte is prepended. The field terminator is then appended. |

The keys are in descending order: k2 < k1.

Hardware Overview

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a computer to operation in a specific fashion. In an embodiment implemented using computer system 200, various computer-readable media are involved, for example, in providing instructions to processor 204 for execution. Such a medium may take many forms, including but not limited to, non-volatile media and volatile media. Non-volatile media includes, for example, optical or magnetic disks, such as storage device 210. Volatile media includes dynamic memory, such as main memory 206.

Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of computer-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   in response to a request to sort data items, in descending order, based on values for a particular field of the data items:
   constructing an array of bytes, for each data item, that represents at least a complement of the value for the particular field of the data item; and
   sorting the data items as requested based on the arrays of bytes;
   wherein constructing the array of bytes, for each data item, includes:
   determining a first one or more bytes that represents the value for the particular field of the data item; and
   constructing a second one or more bytes that represents the complement of the value for the particular field of the data item by subtracting each of the first one or more bytes from a maximum byte value;
   wherein sorting the data items based on the arrays of bytes comprises performing byte-by-byte comparisons between pairs of the arrays of bytes, wherein the byte-by-byte comparison between a pair of the arrays of bytes proceeds until a byte value difference between the pair is identified or the ends of both arrays of bytes of the pair is reached;
   wherein the method is performed by one or more computing devices.

2. The method of claim 1, wherein the data items are rows in a database table and the particular field is a column for the rows.

3. The method of claim 1, wherein constructing the second one or more bytes comprises computing the one's complement of the first one or more bytes.

4. The method of claim 1, wherein the maximum byte value is two hundred and fifty five.

5. The method of claim 1, wherein sorting the data items based on the arrays of bytes comprises repeatedly performing a byte-by-byte comparison between different pairs of the arrays of bytes until the data items have been sorted as requested, wherein the byte-by-byte comparison between each different pair of arrays of bytes proceeds until a byte value difference between the pair is identified.

6. A method comprising:
   in response to a request to sort data items first, in descending order, based on values for a first field of the data items and second, in ascending order, based on values for a second field of the data items:
   constructing an array of bytes, for each data item, that represents at least a complement of the value for the first field of the data item and the value for the second field of the data item; and sorting the data items as requested based on the arrays of bytes;

wherein constructing the array of bytes, for each data item, includes:

determining a first one or more bytes that represents the value for the first field of the data item;

constructing a second one or more bytes that represents the complement of the value for the first field of the data item by subtracting each of the first one or more bytes from a maximum byte value;

determining a third one or more bytes that represents the value for the second field of the data item; and including the second one or more bytes and the third one or more bytes in the array of bytes constructed for the data item;

wherein sorting the data items based on the arrays of bytes comprises performing byte-by-byte comparisons between pairs of the arrays of bytes, wherein the byte-by-byte comparison between a pair of the arrays of bytes proceeds until a byte value difference between the pair is identified or the ends of both arrays of bytes of the pair is reached;

wherein the method is performed by one or more computing devices.

7. The method of claim 6, wherein the data items are rows in a database table and the first field is a first column for the rows and the second field is a second column for the rows.

8. The method of claim 6, wherein constructing the second one or more bytes comprises computing the one's complement of the first one or more bytes.

9. The method of claim 6, wherein the maximum byte value is two hundred and fifty five.

10. The method of claim 6, wherein sorting the data items based on the arrays of bytes comprises repeatedly performing a byte-by-byte comparison between different pairs of the arrays of bytes until the data items have been sorted as requested, wherein the byte-by-byte comparison between each different pair of arrays of bytes proceeds until a byte value difference between the pair is identified.

11. The method of claim 6, wherein constructing the array of bytes, for each data item, includes:

concatenating the first one or more bytes and the third one or more bytes to produce a preliminary array of bytes for the data item; and replacing the first one or more bytes in the preliminary array of bytes with the second one or more bytes.

12. The method of claim 6, further comprising:

receiving a Structured Query Language (SQL) statement that contains the request to sort the data items.

13. The method of claim 12, wherein the first field and the second field are specified in an ORDER BY clause of the SQL statement.

14. A non-transitory computer-readable medium storing instructions which, when executed by one or more computing devices, causes performance of a method comprising:

in response to a request to sort data items, in descending order, based on values for a particular field of the data items:

constructing an array of bytes, for each data item, that represents at least a complement of the value for the particular field of the data item; and sorting the data items as requested based on the arrays of bytes;

wherein constructing the array of bytes, for each data item, includes:

determining a first one or more bytes that represents the value for the particular field of the data item; and constructing a second one or more bytes that represents the complement of the value for the particular field of the data item by subtracting each of the first one or more bytes from a maximum byte value;

wherein sorting the data items based on the arrays of bytes comprises performing byte-by-byte comparisons between pairs of the arrays of bytes, wherein the byte-by-byte comparison between a pair of the arrays of bytes proceeds until a byte value difference between the pair is identified or the ends of both arrays of bytes of the pair is reached;

wherein the method is performed by one or more computing devices.

15. The non-transitory computer-readable medium of claim 14, wherein the data items are rows in a database table and the particular field is a column for the rows.

16. The non-transitory computer-readable medium of claim 14, wherein constructing the second one or more bytes comprises computing the one's complement of the first one or more bytes.

17. The non-transitory computer-readable medium of claim 14, wherein the maximum byte value is two hundred and fifty five.

18. The non-transitory computer-readable medium of claim 14, wherein sorting the data items based on the arrays of bytes comprises repeatedly performing a byte-by-byte comparison between different pairs of the arrays of bytes until the data items have been sorted as requested, wherein the byte-by-byte comparison between each different pair of arrays of bytes proceeds until a byte value difference between the pair is identified.

19. A non-transitory computer-readable medium storing instructions which, when executed by one or more computing devices, causes performance of a method comprising:

in response to a request to sort data items first, in descending order, based on values for a first field of the data items and second, in ascending order, based on values for a second field of the data items:

constructing an array of bytes, for each data item, that represents at least a complement of the value for the first field of the data item and the value for the second field of the data item; and sorting the data items as requested based on the arrays of bytes;

wherein constructing the array of bytes, for each data item, includes:

determining a first one or more bytes that represents the value for the first field of the data item;

constructing a second one or more bytes that represents the complement of the value for the first field of the data item by subtracting each of the first one or more bytes from a maximum byte value;

determining a third one or more bytes that represents the value for the second field of the data item; and including the second one or more bytes and the third one or more bytes in the array of bytes constructed for the data item;

wherein sorting the data items based on the arrays of bytes comprises performing byte-by-byte comparisons between pairs of the arrays of bytes, wherein the byte-by-byte comparison between a pair of the arrays of bytes proceeds until a byte value difference between the pair is identified or the ends of both arrays of bytes of the pair is reached;

wherein the method is performed by one or more computing devices.

20. The non-transitory computer-readable medium of claim 19, wherein the data items are rows in a database table and the first field is a first column for the rows and the second field is a second column for the rows.

21. The non-transitory computer-readable medium of claim 19, wherein constructing the second one or more bytes comprises computing the one's complement of the first one or more bytes.

22. The non-transitory computer-readable medium of claim 19, wherein the maximum byte value is two hundred and fifty five.

23. The non-transitory computer-readable medium of claim 19, wherein sorting the data items based on the arrays of bytes comprises repeatedly performing a byte-by-byte comparison between different pairs of the arrays of bytes until the data items have been sorted as requested, wherein the byte-by-byte comparison between each different pair of arrays of bytes proceeds until a byte value difference between the pair is identified.

24. The non-transitory computer-readable medium of claim 19, wherein constructing the array of bytes, for each data item, includes:

concatenating the first one or more bytes and the third one or more bytes to produce a preliminary array of bytes for the data item; and replacing the first one or more bytes in the preliminary array of bytes with the second one or more bytes.

25. The non-transitory computer-readable medium of claim 19, the method further comprising:

receiving a Structured Query Language (SQL) statement that contains the request to sort the data items.

26. The non-transitory computer-readable medium of claim 24, wherein the first field and the second field are specified in an ORDER BY clause of the SQL statement.

\* \* \* \* \*

UNITED STATES PATENT AND TRADEMARK OFFICE
CERTIFICATE OF CORRECTION

Page 1 of 1

PATENT NO.       : 8,825,674 B2
APPLICATION NO.  : 12/506126
DATED            : September 2, 2014
INVENTOR(S)      : Callaghan et al.

It is certified that error appears in the above-identified patent and that said Letters Patent is hereby corrected as shown below:

In the Claims,

In column 6, line 31, delete "the a" and insert -- the --, therefor.

Signed and Sealed this
Seventeenth Day of March, 2015

Michelle K. Lee
*Director of the United States Patent and Trademark Office*